April 6, 1937.  A. G. SCHAEFER  2,076,045
THERMOSTATICALLY CONTROLLED GAS VALVE
Filed Nov. 20, 1935   3 Sheets-Sheet 1
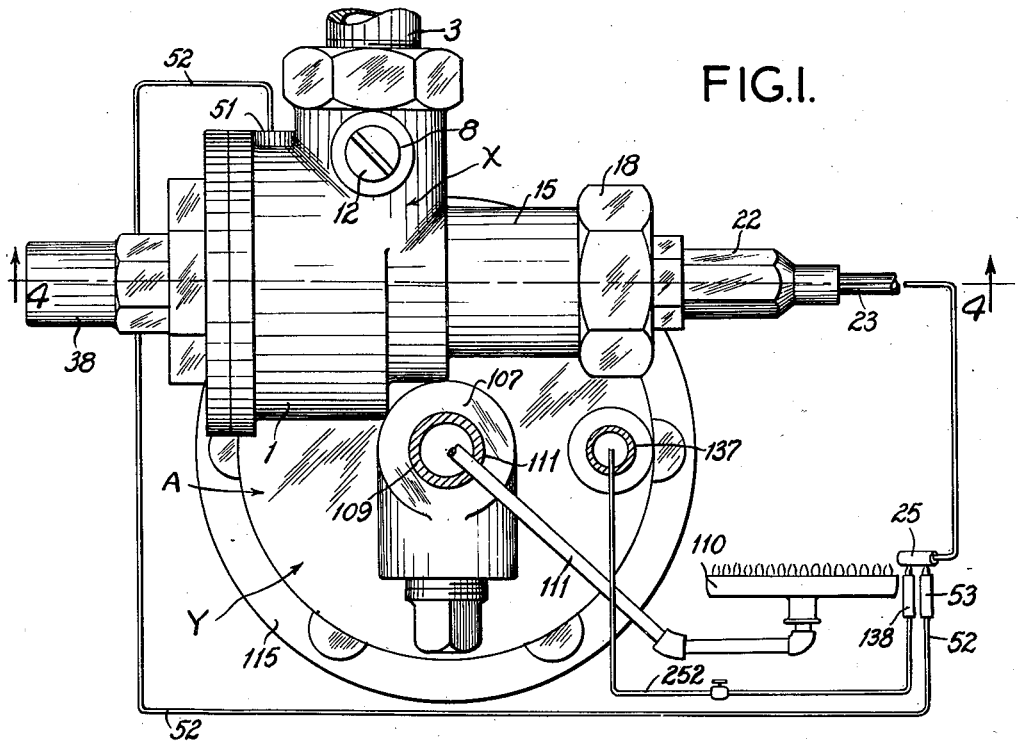
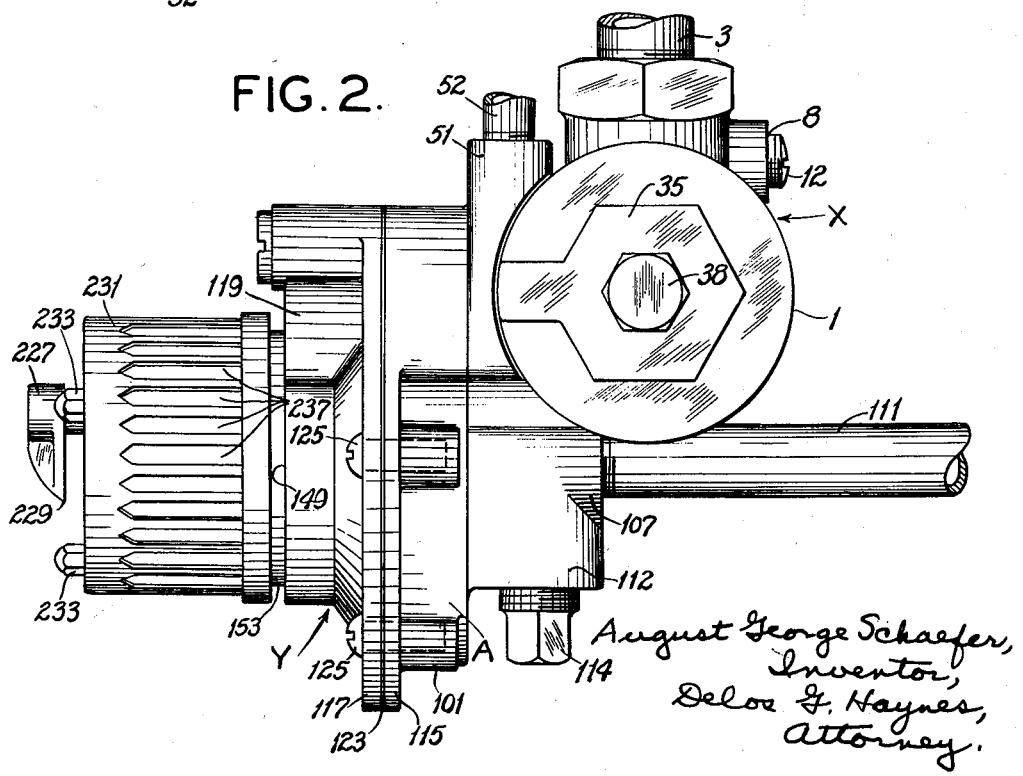

April 6, 1937.  A. G. SCHAEFER  2,076,045

THERMOSTATICALLY CONTROLLED GAS VALVE

Filed Nov. 20, 1935  3 Sheets-Sheet 2

August George Schaefer,
Inventor,
Delos G. Haynes,
Attorney.

April 6, 1937. A. G. SCHAEFER 2,076,045
THERMOSTATICALLY CONTROLLED GAS VALVE
Filed Nov. 20, 1935 3 Sheets-Sheet 3

August George Schaefer,
Inventor,
Deloz F. Haynes,
Attorney.

Patented Apr. 6, 1937

2,076,045

UNITED STATES PATENT OFFICE 2,076,045

THERMOSTATICALLY CONTROLLED GAS VALVE

August George Schaefer, Attleboro, Mass., assignor to Spencer Thermostat Company, Attleboro, Mass., a corporation of Massachusetts Application November 20, 1935, Serial No. 50,660

6 Claims. (Cl. 236—1)

This invention relates to thermostatically controlled gas valves, and with regard to certain more specific features, to a combination safety pilot valve and regulating valve.

Among the several objects of the invention may be noted the provision, in a unitary structure, of a combination safety pilot valve and a regulating valve of the diaphragm type, in which passages leading from the combination of valves are minimized in number and combined in an effective manner; and the provision of a combination valve of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a plan view of the combination valve embodying the present invention, including a diagrammatic representation of certain connections thereto;

Fig. 2 is an elevation of the valve of Fig. 1, taken from the left-hand side thereof;

Similar reference characters indicate corresponding parts throughout the several views of the drawings.

In the application of Waldo A. Saul, Serial No. 56,071, filed December 24, 1935, there is shown and described a novel form of safety pilot valve. In the application of John A. Spencer, Serial No. 735,215, filed July 14, 1934, now Patent No. 2,039,358, dated May 5, 1936, there is shown and described a diaphragm or regulating valve. It is the object of the present invention to combine the Saul safety pilot valve and the said Spencer diaphragm valve into a unitary structure, with such consequent advantages as will be made apparent hereinafter. The safety pilot valve and the regulating valve are separately claimed in the respective Saul and Spencer applications identified.

Referring now more particularly to Fig. 1, index character X indicates the safety pilot valve forming part of the present invention. Index character Y similarly indicates the diaphragm or regulating valve. These two valves are combined together in a unitary structure, as will be pointed out hereinafter.

Figure 3:
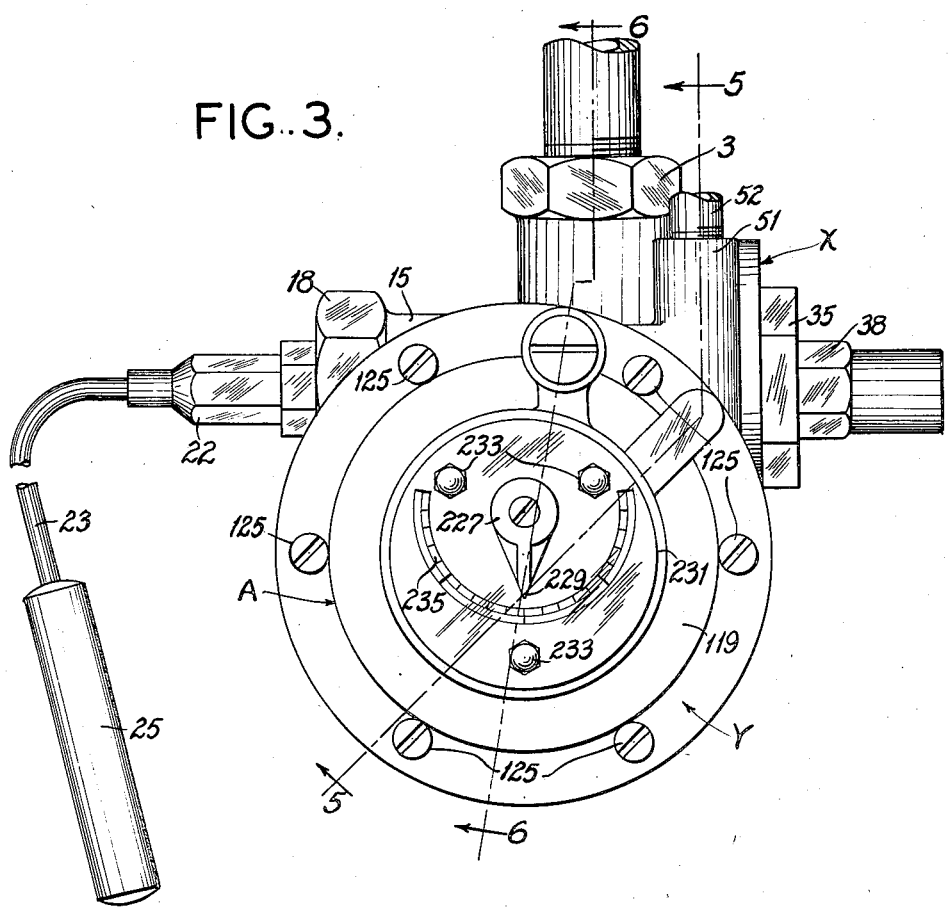
Fig. 3 is a plan view of the valve of Fig. 1, taken from the reverse side thereof.
Figure 4:
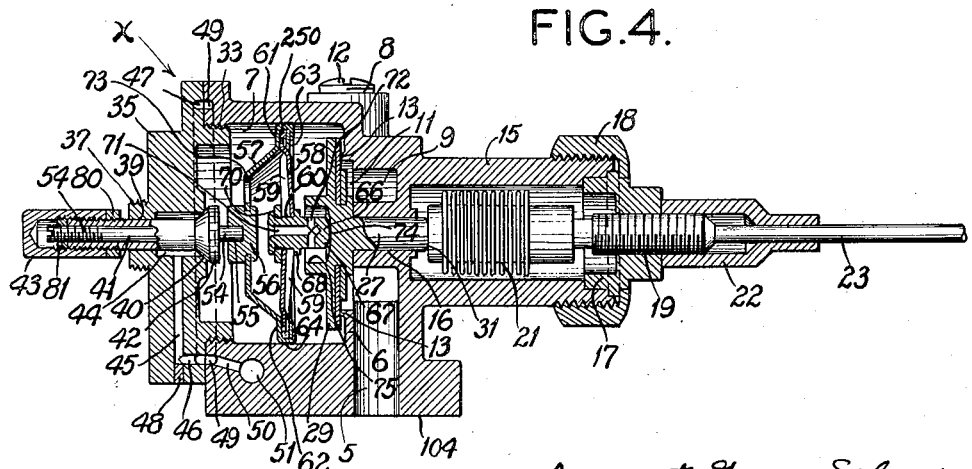
Fig. 4 is a fragmentary horizontal section taken substantially along line 4—4 of Fig. 1, and illustrating the construction of a safety pilot valve.

The structure of the safety pilot valve X is as follows:

Referring now more particularly to Figures 1, 2, and 4, numeral 1 indicates a valve body having an inlet 3, and an outlet portion 5, respectively. The body 1 includes an internal chamber (see Fig. 4), which is divided by a customary partition 6 into an inlet chamber 7 and an outlet chamber 9. The partition 6 includes an opening 11, which provides a valve seat 13, in the usual manner.

The inlet 3 is provided with an auxiliary opening 8 for a pilot line or the like. Opening 8 is normally not used, unless an unprotected constant-burning pilot flame is desired. In the drawings a plug 12 is shown as closing off the opening 8.

Extending in one direction from the valve casing 1 at right angles to the plane of the opening 11, is a cylindrical housing member 15, which inwardly terminates in a bearing portion 16. The member 15 is closed at its outer end by a plug 17, which is in turn held in position by a nut 18 threaded to the end of cylinder 15. The plug 17 has a central threaded opening to receive the threaded stem 19 of a flexible bellows 21. The relative position of the bellows 21 in the cylindrical member 15 may be adjusted by threading the stem 19 into and out of the plug 17. A lock nut 22 holds the bellows in position once it is established.

Sealed to the outer end of the stem 19 is a so-called capillary metallic tube 23, which is sufficiently flexible to permit of its being bent, without breaking, during installation of the device. To the other end of the tube 23 is affixed a bulb 25. The bulb 25, tube 23, stem 19 and bellows 21 are all sealed together in a closed arrangement, so that no leakage of a fluid in the system may take place. Their particular construction is the subject of the copending application of John A. Spencer, Serial No. 696,344, filed November 2, 1933.

The bearing portion 16 slidably receives a stem 27 to which is affixed valve closure element or disc 29. The disc 29 is adapted to seat upon the valve seat 13, in order to place the valve in closed condition so that communication between inlet 3 and outlet 5 is cut off. The opposite end of the valve stem 27 abuts the inner end 31 of the bellows 21.

On the opposite side of the valve casing is provided a threaded opening 33 which is coaxial with the cylindrical housing 15. Into the opening 33 fits a threaded cap or plug 35, which outwardly terminates in a bearing portion 37, exteriorly threaded to receive a cap 38, shown in Fig. 1 and Fig. 2. The bearing portion 37 includes a central opening 39 through which slides a stem 41. To the outer end of the stem 41 is threaded a manually operative knob 43. A lock nut 80 holds the knob 43 in position. The inner end of the stem 41 comprises a back-seating valve closure element 42, which seats against a back-seating valve seat 40 formed in the plug 35. There is provided a passage 44 surrounding the stem 41, which communicates with a radial bore 45, which in turn communicates with a bore 46 leading to an annular groove 47 in the face of the plug 35. The outer end of the bore 45 is sealed off, as indicated at numeral 48. The annular groove 47 juxtaposes an annular groove 49 of identical size in the face of the body portion 1. Communicating with this groove 49 is a passage 50 which leads to a threaded outlet 51. In operation, the outlet 51 receives a pipe 52 which conducts gas to a preheat pilot burner 53 (see Fig. 1) which is adapted to heat the bulb 25.

Inwardly threaded into the stem 41 (see Fig. 4) is a pin portion 54 of reduced diameter. A lock nut 81 holds the pin 54 in fixed position. The inner end of the pin 54, in assembly, seats in a suitable opening 55 in a boss 56 formed on one face of a movable housing 57. The housing 57 is somewhat frusto-conical in shape, and carries mounted at its wider side, a spring actuating element 58. The actuating element 58 is preferably a radially corrugated snap-acting disc, and is preferably made in accordance with the teachings of John A. Spencer Patent 1,972,172, dated September 4, 1934. It comprises a disc of resilient metal, such as spring brass, steel or the like, which is provided with a relatively large number of radial corrugations 59, a central opening 60, and a flat uncorrugated rim portion 61. The flat rimmed portion 61 seats upon a shoulder 62 formed in the housing 57, and is peripherally spaced by a ring 250, which is thicker than the rim 61 of the disc 58. A loose ring or washer 63 is placed on the other side of the rim 61, and the edge of the housing is then over-turned or spun inwardly, as illustrated at numeral 64, in order to secure the disc 58 relatively loosely in position. A relatively loose mounting is important in order to permit the snapping movement of the disc 58, as will be pointed out hereinafter. The diameter of the housing 57 is such that it slides easily in the cylindrical chamber 7 of the body portion 1.

The disc 58 is initially formed in such manner that its general shape is slightly conical in one direction. As a result of the initial shaping of the disc, it may be overcentered by applying a force to occupy a conformation of conicity in the opposite direction. However, this conformation of conicity in the opposite direction is only relatively stable and persists only so long as a minimum force is applied to the disc. Whenever such a force is removed, the disc automatically snaps back to its initial position. For this reason, the disc in its initial position, is referred to as being in a position of "absolute" stability while in its over-centered position, it is referred to as being in its position of "comparative" stability.

The reasons for this characteristic of the disc are set forth in detail in the said Spencer Patent 1,972,172, and need not be repeated herein. It is to be noted, however, that the force required to move the disc from its position of absolute stability to its position of comparative stability is greater than the force required to maintain said disc in its position of comparative stability once it has been placed there.

Returning to Fig. 4, it will be seen that there is mounted in the central opening 60 of the disc 58, a plug element 66, which has a cylindrical body with a rounded nose 67 and an outwardly extending flange 68. The opposite end of the plug is reduced in diameter to receive a washer 70, and is then upset to hold said washer 70 in position. The inner periphery of the disc 58 is received loosely between the flange 68 and the washer 70. The loose fit is essential in order to permit a snapping movement of the disc. The plug 66 is longitudinally drilled as indicated at numeral 71, and laterally drilled, as indicated at numeral 72, in order to provide a free path for gas to pass from the right of the disc 58 to the interior of the housing 57. A hole 73 is also provided in the back of the housing 57, in order to permit the gas to flow freely therethrough to the region of the chamber 7 back of the housing 57.

It will be seen that the rounded nose 67 of the plug 66 seats in a spherical bottom 74 provided inside an upstanding flange 75 on the back face of the valve closure element 29.

The various parts are so dimensioned that, with the valve 29 seated on the seat 13 and the disc 58 in its position of absolute stability (conical to the right, when referred to Fig. 4), the stem 41 is in its outwardly extended position with the back-seating valve 42 seated upon its seat 43. Under these conditions, the position of the threaded stem 19 in the plug 17 is likewise so adjusted that when the bulb 25 is cold, a firm contact is had between the end 31 of the bellows 21 and the valve stem 27, but little or no pressure is exerted on said valve stem 27 by the bellows 21.

Under these conditions, the resilient force of the disc 58, when in its position of absolute stability, is brought to bear upon the valve closure element 29 in such a manner as to seat it tightly upon its seat 13. The resilient force of the disc 58 is likewise brought to bear upon the back-seating valve 42, in such a manner as to seat it tightly upon its seat 43. Thus, no gas is permitted to pass from the inlet chamber 7 to either the outlet chamber 9 or to the preheat pilot burner line 51.

The operation of the valve as thus described is as follows:

The system comprising the bellows 21 and bulb 25 is filled with a fluid or gas or the like which undergoes considerable volume change upon change of temperature. The choice of the fluid or gas to be used depends upon the range of temperature in which the device is to be used. Argon, for example, has been found best in the present instance because of the high temperature at which it is desired to operate the bulb. Argon is an inert gas even at high temperatures and the walls of the container are less permeable to it than to other inert gases. Under what will hereinafter be termed "cold" conditions, the volume of the fluid is such that the end 31 of the bellows 21 exerts a force upon the stem 27 substantially less than that force required to maintain the disc 58 in its position of comparative stability. This adjustment may be effected by loosening the nut 22 and rotating the threaded stem 19 to regulate the longitudinal position of the bellows 21 in the cylindrical housing 15, and thereafter retightening the nut 22.

The valve is initially considered to be in the position shown in Fig. 4. The first operation of the user comprises manually pushing button 43 into the valve casing. This action, in the first place, unseats the back-seating valve 42 from its seat 40, permitting passage of gas from the inlet chamber 7 through the passages 44, 45, 46, 50, and 52 in sequence, to the present pilot burner 53. In thus pushing the button 43, the operator has displaced the disc 58 to the amount permitted by the degree of movement of the button, but not entirely to its position of comparative stability. This movement of the disc is accomplished by the movement applied on its periphery by the housing 57, reacting against the relatively stationary central portion of the disc, as held in position by the plug 66 abutting the seated main valve 29. If the operator relaxes the force on the button 43 to a value less than that required to hold the disc in its intermediate displaced position, it will be seen that the disc 58 immediately moves back to its position of absolute stability, shutting off the back-seating valve.

However, assuming that the operator, for the time being, holds the push button 43 in its pushed-in position, it will be seen that gas will flow to the preheat pilot burner 53. If this is now ignited, it will heat the bulb 25, and the fluid in the bulb and bellows system will commence to expand. Ultimately, the expansion will be sufficient so that the end 31 of the bellows 21 will react against the valve stem 27 with a force sufficient to carry the disc 58 from its intermediate displaced position the rest of the way to its position of comparative stability. When this condition has been achieved, the operator will find that he can relax his hold on the button 43. The button will thereupon move back to its extended position, but without a snap movement. Here it will be seen that the disc 58 is now maintained in its leftward conical position, or position of comparative stability, not by the manually applied force of the operator, but by the force exerted by the bellows 21. The position of the elements is now such that the main valve 29 is unseated from its seat 13, permitting the flow of gas to the outlet chamber 9. The stem 41 being in its extended position, however, the back-seating valve 42 is now seated upon its seat 40, preventing the flow of gas through the line 52 to the preheat pilot burner 53. The disc 58 is maintained in its position of comparative stability by the force exerted on its central portion by the plug 66, reacting against the now rigidly held periphery of the disc (rigid because of the seating of the back-seating valve 42).

The bulb 25 is normally so positioned that, as long as a pilot burner 138, to be described hereinafter, is burning, the fluid is maintained hot enough to sustain the force necessary to keep the disc 58 in its position of comparative stability.

If, however, the said pilot burner 138 should go out permitting the fluid in the bulb and bellows system to cool, the bellows 21 will no longer maintain the necessary force on the disc 58, and said disc 58 will instantaneously snap to its position of absolute stability. In so doing, it will close the main valve 29 upon its seat 13, thus returning all of their elements to their initial, or Fig. 4, position. Before further operation of the main burner can then be obtained, it is necessary that an operator manually push the button 43, or, in other words, repeat the cycle of events above described.

It is to be noted that the adjustment of the bellows 21 in the housing 15 is so arranged that under normal temperature conditions the force of the bellows 21 is never permitted to build up to such a value as would overcenter the disc from its position of absolute stability to its position of comparative stability, for the particular disc 58 used, although a force slightly exceeding the force necessary to maintain the disc in its position of comparative stability is reached when the bulb 25 is heated.

The construction of the diaphragm or regulating valve unit Y of the present invention is as follows:

Referring now more particularly to Figures 1, 2, 3, 5, and 6, it will be seen that the regulator valve Y comprises a diaphragm valve assembly indicated broadly by index-character A, a bleeder valve assembly B, and a thermostatic control C for the bleeder valve B. In the operation of the invention, which will be elucidated in considerably more detail hereinafter, the bleeder valve B, which is operated by the thermostatic control C in response to ambient temperature variations, constitutes a relay system causing operation of the diaphragm valve A. For facility of description, the diaphragm valve A will first be described in detail.

Numeral 101 indicates the rear half of a valve casing, which is generally circular in shape. This casing 101 has a flat portion 102 which is adapted to abut a similar flat portion 104 (see Fig. 4) on the outlet side of the pilot valve casing 1, and be held thereto by screws 106 (see Fig. 6). An inlet passage 103 is provided in this flat portion 102, said inlet passage 103, in assembly, communicating with the outlet passage 5 of the safety pilot valve. A main inlet passage 251 likewise is provided and connects the diaphragm valve A with the safety pilot valve X. A gasket 108 is desirably fitted between the safety pilot valve X and the regulator valve Y.

A vertical tubular portion 107 is provided at the center of the casing 101, the outer end of which is threaded to comprise the valve outlet, as indicated at numeral 109, which receives an outlet pipe 111. The outlet pipe 111 conducts gas to a main burner 110. An auxiliary outlet 112, normally closed by a plug 114, is also provided. The inner end 113 of the tubular portion 107 is formed as a valve seat. The upper periphery of the casing 101 is provided with a flange 115 which juxtaposes a similar flange 117 on the front half 119 of the valve casing. The front casing member 119 is likewise circular, and is interiorly hollow to provide a chamber 121. Between the flanges 115 and 117 is clamped the periphery of a circular diaphragm 123. Studs 125 hold the two halves of the casing together and provide the clamping means by which the diaphragm 123 is secured in position.

A bolt 127, together with its nut 129, secures to the center of the diaphragm 123 a valve closure element 131, which is positioned to seat upon the valve seat 113. Between the closure element 131 and the diaphragm 123 are a weight member 133 and brass washers 135 which serve to protect the surfaces of the leather of the diaphragm 123 from the bolt 127.

A threaded outlet 137 provides means for connecting a conduit 252 for the supply of a main pilot burner 138 for ignition purposes at the main burner 110. This pilot burner 138 is normally kept burning as long as the main valve of the safety pilot valve X is open, regardless of whether or not the main burner 110 is burning. It is also disposed to apply its heat to the bulb 25. It is normally ignited by the preheat pilot burner 53.

Connecting the outlet 5 of the safety pilot valve X (and hence the chamber 141 of the lower casing 101), and the chamber 121 of the upper casing 119, by way of the passage 103, is a passage 143, which has inserted therein an orifice member 145. The orifice member 145, which is of usual construction, has an opening 147 therethrough through which gas may pass, but only at a comparatively slow rate. An adjustable needle valve may be substituted for the orifice member 145, if adjustability is desired.

The front casing member 119 is provided with a flat portion 149, upon which is mounted the bleeder valve and thermostatic control assemblies B and C, respectively. Studs 151 secure a body portion 153, having an outwardly extending flange 155, to said flat portion 149, a gasket 157 being interposed therebetween to secure a gas-tight connection. The body 153 is generally cup-shaped, having an inner chamber 159 therein. The outer end of the body 153 is interiorly threaded to receive a closure 161. A passage 163 leads downwardly from the chamber 159 to connect with a similarly positioned passage 165 in the front valve casing member 119 (a suitable opening in the gasket 157 being provided).

The intersection of the passage 163 and the chamber 159 provides a circular valve seat 169, against which closes a valve closure element 171 of customary conical form, which is carried at the lower end of a stem 173. The stem 173 slides in a suitable bore in the closure 161. A valve seat 175 is likewise provided in the closure 161, against which seats a reverse conical portion 177 on the valve closure element 171; this arrangement providing for back-seating of the bleeder valve.

Figure 5:
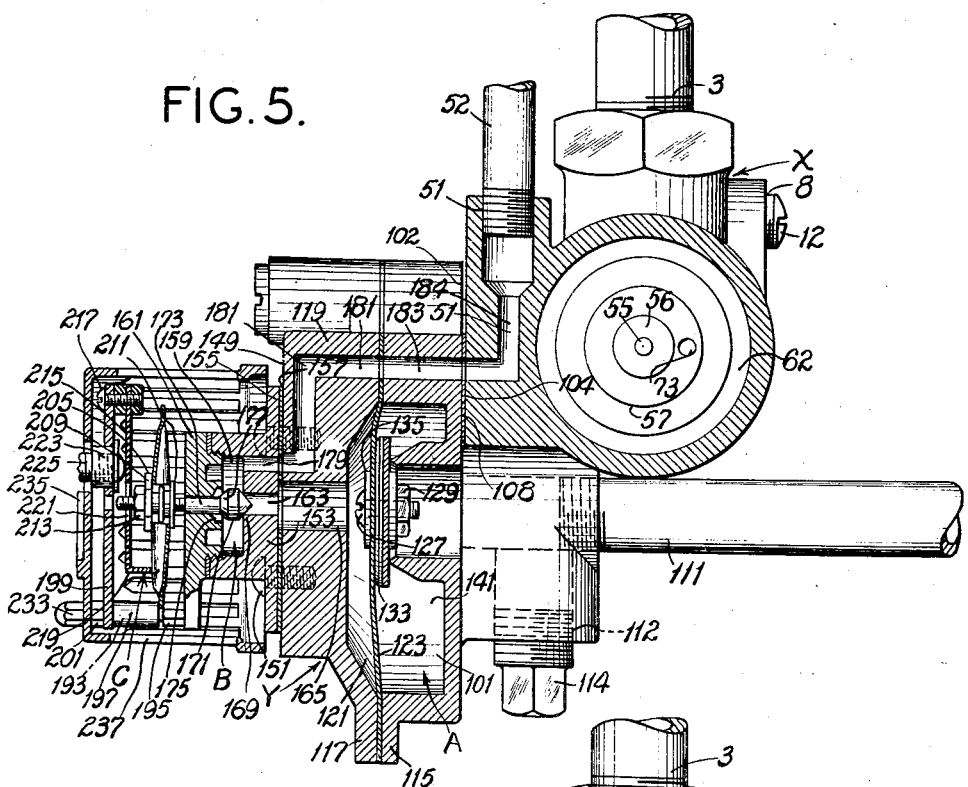
Fig. 5 is a section taken substantially along line 5—5 of Fig. 3, and illustrating the construction of a diaphragm valve.
Figure 6:
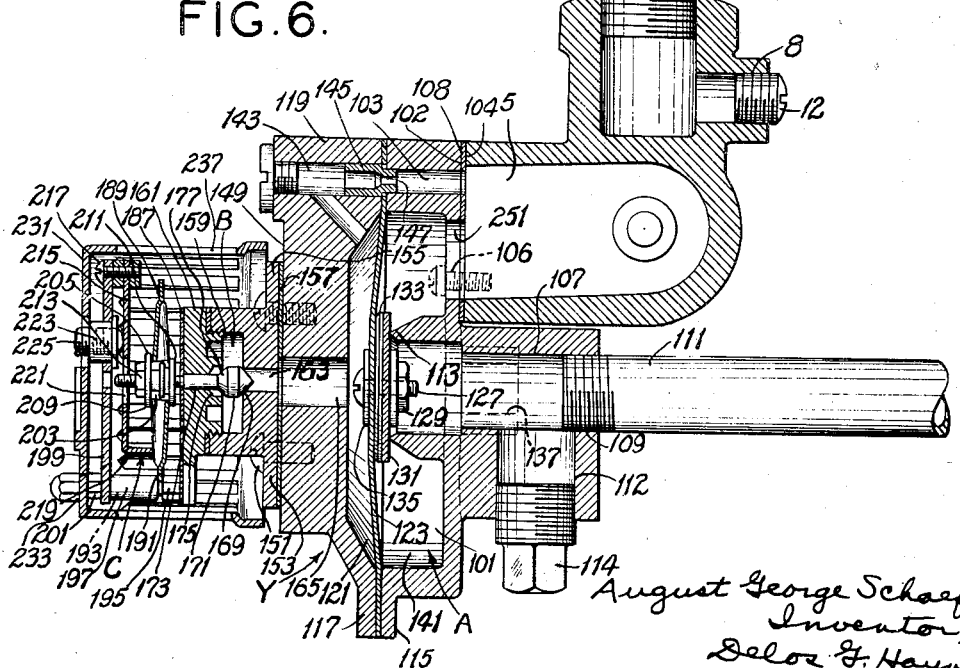
Fig. 6 is a section similar to Fig. 5, but taken along line 6—6 of Fig. 3.

Referring more particularly to Fig. 5, there is provided a passage 179 leading from the chamber 159, and coinciding with a passage 181 in the front valve casing 119, which in turn coincides with a passage 183 in the lower valve casing 101. The passage 183 in turn communicates with a bore 184 that connects with the passage 51 in the casing 1 of the safety pilot valve X. It will be understood that a suitable opening is provided in the gasket 108 to make this connection possible. This connection is one of the principal features in the present invention. As will be seen, it provides that the bleed flow from the diaphragm or regulator valve Y is conducted from the entire combination in the same line that conducts the gas from the safety pilot valve to the pre-heat pilot 53. Within the regulator valve, the passage 179—181—183 comprises a bleeder line. By its connection with the pipe 52 and pilot burner 53, it leads to a region of relatively lower pressure than the interior of the regulator valve. In addition, it leads whatever gas may be bled from the regulator valve, in the course of regulation, to a pilot burner where it is sure to be ignited under all circumstances, and thus not escape into the atmosphere.

Mounted on the flat surface of the closure 161 is the thermostatic control C. It is desirable, in order to protect the thermostatic elements from the heat- (or cold-) storage of the valve body, that a layer of heat insulation 187 be secured between the closure 161 and the control elements mounted thereon, but such provision is not absolutely essential. The important element of the thermostatic control comprises a composite thermostatic metal, radially corrugated disc 189, of the general type shown in John A. Spencer Patent 1,895,591, issued January 31, 1933, and entirely similar to the disc 58 in the safety pilot valve X.

The disc 189 has a smooth peripheral region 191 by which it is mounted. Three studs 193 are threaded into the closure 161, the studs 193 each having a nut portion 195 formed immovably thereon. The placement of the studs is such that the periphery 191 of the disc 189 rests upon these three nut portions 195. Sleeves or collars 197 are then slipped on the studs 193, the periphery 191 being positioned between the nut portions 195 and sleeves 197, a raised shoulder on the nut portions 195, slightly higher than the thickness of the disc edge 191, keeping the disc from being tightly bound. A plate 199 is next placed in position on the studs 193, and the nuts 201 clamp all of these elements in one position.

The disc 189 is provided with a central hole or opening 203, through which passes the threaded upper end of stem 173 of the bleeder valve closure element 171. A collar 205, which has outwardly extending flanges 209 and 211, is formed around the inner periphery of the disc 189, so that said flanges 209 and 211 loosely embrace the inner periphery of the disc 189 therebetween. A lock nut 213 secures the collar 205 in position on the stem 173. By these means the themostatic displacement of the central portion of the disc 189 reciprocates the valve stem 173 on its axis, and hence operates the bleeder valve.

The thermostatic disc 189 is subject, in operation, to two adjustments, namely, adjustment of the operating differential and adjustment of the operating temperature. The operating differential of the disc constitutes the difference between the temperature that it snaps from cold to hot position upon increase of temperature, and the temperature that it snaps from hot to cold position upon decrease of temperature. As is explained in more detail in John A. Spencer Patent No. 1,972,832, dated September 4, 1934, this operating differential may be controlled by limiting the extent of movement of the central, movable portion of the disc 189 between its hot and cold positions, and by shifting the point of bearing of a spring 215 on the disc 189, both of these means being used when a very small differential is desired. In the present invention, the differential is set once and for all in the factory assembly of the valve, and no means are provided for external differential adjustment. The limitation of the extent of movement of the central movable part of the disc is achieved by restricting the degree of movement permitted between the direct and back-seated positions of the bleeder valve closure element 171. The required degree of factory adjustment is here provided by the extent to which the closure element 161 is threaded into the body 153. Since the disc 189 is mechanically coupled for movement with the stem 173 of the valve closure element 171, restriction of the extent of movement of said closure element is likewise a restriction of the extent of movement of the disc 189. The final differential adjustment is effected by shifting leaf spring 215 into and out of the clamp supporting the same (after loosening bolts 217) so as to adjust the point of bearing of the leaf spring on the disc toward or away from the center of the disc. The particular structure and function of the leaf spring 215 is brought out hereinafter.

Temperature control, as distinguished from differential control, is the control of the temperature at which the disc snaps in either direction. This control is achieved, in the present invention, as in said Spencer Patent No. 1,972,832, by the application of a variable resilient force to the movable region of the disc 189 tending to aid or oppose its snapping movement. This variable resilient force is provided by a resilient blade, or leaf-spring 215, one end of which is clamped by a pair of bolts 217 to the underside of the plate 199, and the other end of which is bent downwardly, as at numeral 219, to engage the surface of disc 189. A hole 221 in the blade 215 permits free passage of the valve stem 173. Threaded into a suitable nut 223 mounted in the plate 199 is a stud 225, the lower end of which bears against the upper surface of blade 215. The upper end of the stud 225 carries an adjusting knob 227 which has a pointer 229 thereon. It will readily be seen that threading the stud 225 into the plate 199 increases the resilient pressure on the disc 189, while threading the stud out of the plate 199 decreases the resilient pressure on the disc 189. Thus is the operating temperature of the disc varied.

The entire thermostatic control assembly C and the bleeder valve assembly B are encased in a cup-shaped cover portion 231, which is held in position by nuts 233 on the studs 193. Two of the nuts 233 act as stops to limit the arc through which adjusting knob 227 may be turned. A scale 235 is provided to cooperate with the pointer 229 on knob 227 to indicate the temperature for which the control is set to operate. The cover 231 is desirably provided with many openings 237 therethrough, so that air currents will maintain the region of the disc 189 at the ambient temperature surrounding the valve as a whole.

The operation of the regulator valve Y as thus described is as follows:

It is assumed that the safety pilot valve X is in open position so that line gas pressure is provided in the rear chamber 101 of the regulator valve through said safety pilot valve. It is also assumed, initially, that the thermostat 189 is in its hot, downwardly-conical position, thus holding the bleeder valve 171 closed.

Under these conditions, gas will leak through the passage 143 and orifice member 145 into the forward chamber 121, and therein build up a pressure equal to that in the chamber 141. Thus, with the pressure on each side of it the same, the diaphragm 123 will, under the influence of the weight 133, cause the valve closure element 131 to seat upon the valve seat 113, and thereby cut off the flow of gas to the outlet pipe 111.

It will be understood that, in operation, the entire assembly must be mounted so that the diaphragm 123 is substantially horizontal.

However, if the ambient temperature drops past the temperature set by the knob 227, the disc 189 snaps over to its upwardly conical position, thus removing the valve closure element 171 from its seat 169 and permitting gas from chamber 121 to flow to chamber 159 and thence through passages 179, 181, 183, 184, 51, and 52 to the pilot burner 53, where it is ignited and burned. This means that the pressure in chamber 121 will at once drop, since the orifice member 145 prevents flow of gas from the chamber 141 in sufficient volume to keep up the pressure therein, and because of the now greater pressure on the under side of diaphragm 123, it will move upwardly and unseat the valve 131, thus permitting the flow of gas to the outlet pipe 111.

As soon as the ambient temperature reaches the required minimum, however, the bleeder valve 171 immediately closes and at once pressure is again built up in the chamber 121 to close the diaphragm valve again.

By setting the knob 227, the temperature at which the valve opens may readily be controlled throughout the desired range of values.

The valve as described is conditioned to operate so that it is open below a certain temperature, and closed above another certain temperature. The difference between these certain temperatures is the operating differential of the thermostat. If a reverse action is desired (that is, if it be desired that the valve be closed below a certain temperature and open thereabove), this can most readily be done by inverting the thermostatic disc 189, so that it is upwardly conical in its hot position, and downwardly conical in its cold position.

Considered as a combination, it will be seen that the safety pilot valve and the regulator or diaphragm valve, thus described, operate serially on the flow of gas from the inlet 3 through to the outlet 111. The safety pilot valve provides that no gas flow reaches the regulator valve in any event, unless the main pilot burner is ignited. The regulating valve, in turn, controls the burning of the main burner 110 in accordance with ambient temperature, as long as the safety pilot valve permits.

A particular advantage of the combination is the manner in which the outlet for the preheating pilot 53 and the bleeder line from the regulator valve are combined. This arrangement provides a convenient disposal or utilization for the bleed gas from the regulator valve, and at the same time, provides a highly efficient, utilizable pre-heating pilot for the gas burner control system, to operate in conjunction with the safety pilot valve.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In combination in a unitary structure, a safety pilot valve and a diaphragm-type regulator valve, inlet means for said safety pilot valve, outlet means for said safety pilot valve constituting also the inlet means for said regulator valve, and outlet means for said regulator valve, said safety pilot valve having a back-seating valve therein and a passage leading from said back-seating valve, and said regulator valve having a bleed line therein, said bleed line communicating with and forming a part of said last-named passage.

2. In combination in a unitary structure, a safety pilot valve and a diaphragm-type regulator valve, inlet means for said safety pilot valve, outlet means for said safety pilot valve constituting also the inlet means for said regulator valve, and outlet means for said regulator valve, said safety pilot valve having a back-seating valve therein and a passage leading from said back-seating valve, and said regulator valve having a bleed line therein, said bleed line communicating with and forming a part of said last-named passage, and outlet means communicating with the inlet side of said regulator valve.

3. In a gas burner system, a main burner, a main pilot burner, and an auxiliary pilot burner, and a combination safety pilot valve and regulator valve connected in the gas supply line to said main burner, said safety pilot valve having an outlet communicating with said auxiliary pilot, said last-named outlet also communicating with a bleed valve in said regulator valve.

4. In a gas burner system, a main burner, a main pilot burner, and an auxiliary pilot burner, and a combination safety pilot valve and regulator valve connected in the gas supply line to said main burner, said safety pilot valve having an outlet communicating with said auxiliary pilot, said last-named outlet also communicating with a bleed valve in said regulator valve, a separate outlet in the inlet side of said regulator valve communicating with said main pilot burner.

5. In a gas burner system, a main burner, a main pilot burner, and an auxiliary pilot burner, and a combination safety pilot valve and regulator valve connected in the gas supply line to said main burner, said safety pilot valve having an outlet communicating with said auxiliary pilot, said last-named outlet also communicating with a bleed valve in said regulator valve, said safety pilot valve having a thermostatic system for operating the same, said thermostatic system comprising a bulb and bellows system, said bulb being located in juxtaposition to said main burner and said main and said auxiliary pilot burners.

6. In combination, a safety pilot valve and diaphragm-type regulator valve, said combination having a unitary outlet passage, said unitary outlet passage connecting with a back-seating valve in said pilot valve and with a bleed line forming part of said regulator valve.

AUGUST GEORGE SCHAEFER.